(12) United States Patent
Bohn

(10) Patent No.: US 8,998,414 B2
(45) Date of Patent: Apr. 7, 2015

(54) INTEGRATED EYE TRACKING AND DISPLAY SYSTEM

(75) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/245,700

(22) Filed: Sep. 26, 2011

(65) Prior Publication Data

US 2013/0077049 A1 Mar. 28, 2013

(51) Int. Cl.
*A61B 3/14* (2006.01)
*G02B 5/20* (2006.01)
*G02B 27/00* (2006.01)
*G02B 27/01* (2006.01)

(52) U.S. Cl.
CPC .............. *G02B 5/20* (2013.01); *G02B 27/0093* (2013.01); *G02B 27/017* (2013.01); *G02B 2027/0178* (2013.01); *G02B 2027/0187* (2013.01)

(58) Field of Classification Search
USPC .............................. 351/210, 206, 209; 345/8; 348/E13.045, E13.047, E13.066
See application file for complete search history.

(56) References Cited

U.S. PATENT DOCUMENTS

| | | | |
|---|---|---|---|
| 4,634,384 A | 1/1987 | Neves et al. | |
| 5,016,282 A | 5/1991 | Tomono et al. | |
| 5,471,542 A | 11/1995 | Ragland | |
| 5,689,619 A | 11/1997 | Smyth | |
| 5,886,822 A | 3/1999 | Spitzer | |
| 6,055,110 A | 4/2000 | Kintz et al. | |
| 6,120,461 A * | 9/2000 | Smyth | 600/558 |
| 6,351,335 B1 | 2/2002 | Perlin | |
| 6,433,760 B1 | 8/2002 | Vaissie et al. | |
| 6,456,262 B1 | 9/2002 | Bell | |
| 6,578,962 B1 | 6/2003 | Amir et al. | |
| 6,659,611 B2 | 12/2003 | Amir et al. | |

(Continued)

FOREIGN PATENT DOCUMENTS

| | | |
|---|---|---|
| CA | 2685976 A1 | 11/2008 |
| CN | 1771454 A | 5/2006 |

(Continued)

OTHER PUBLICATIONS

Office Action dated Sep. 6, 2012, U.S. Appl. No. 13/221,739, filed Aug. 30, 2011, 61 pages.

(Continued)

*Primary Examiner* — Scott J Sugarman
*Assistant Examiner* — Mustak Choudhury
(74) *Attorney, Agent, or Firm* — Jeremy Snodgrass; Judy Yee; Micky Minhas

(57) ABSTRACT

Technology is provided for an integrated eye tracking and display system for a see-through, near-eye, mixed reality display device. Image data and IR illumination for eye tracking are optically coupled into a respective see-through, planar waveguide positioned to be seen through by each eye in a respective display optical system of the display device. The respective planar waveguide comprises one or more wavelength selective filters positioned to be co-axial with an optical axis of the respective display optical system. The wavelength selective filters direct IR and visible illumination out of the planar waveguide in the direction of the respective eye and direct IR reflections, including reflections from the eye, into the planar waveguide. The reflections are optically coupled out of the waveguide to an IR sensor which generates eye tracking data based on the reflections.

12 Claims, 14 Drawing Sheets

(56) References Cited

U.S. PATENT DOCUMENTS

| | | | |
|---|---|---|---|
| 6,671,100 | B1 | 12/2003 | McRuer |
| 6,886,137 | B2 | 4/2005 | Peck et al. |
| 7,130,447 | B2 | 10/2006 | Aughey et al. |
| 7,391,887 | B2 | 6/2008 | Durnell |
| 7,396,129 | B2 | 7/2008 | Endrikhovski et al. |
| 7,401,920 | B1* | 7/2008 | Kranz et al. ............ 351/210 |
| 7,457,434 | B2 | 11/2008 | Azar |
| 7,522,344 | B1 | 4/2009 | Curatu et al. |
| 7,532,230 | B2 | 5/2009 | Culbertson et al. |
| 7,533,988 | B2 | 5/2009 | Ebisawa |
| 7,538,744 | B1 | 5/2009 | Liu et al. |
| 7,542,210 | B2 | 6/2009 | Chirieleison, Sr. |
| 7,686,451 | B2 | 3/2010 | Cleveland |
| 7,736,000 | B2 | 6/2010 | Enriquez et al. |
| 7,883,415 | B2 | 2/2011 | Larsen et al. |
| 2002/0105482 | A1 | 8/2002 | Lemelson et al. |
| 2002/0167462 | A1 | 11/2002 | Lewis et al. |
| 2005/0047629 | A1 | 3/2005 | Farrell et al. |
| 2006/0028400 | A1 | 2/2006 | Lapstun et al. |
| 2006/0077558 | A1 | 4/2006 | Urakawa et al. |
| 2006/0250322 | A1 | 11/2006 | Hall et al. |
| 2008/0024597 | A1 | 1/2008 | Yang et al. |
| 2008/0048931 | A1 | 2/2008 | Ben-Ari |
| 2008/0117289 | A1 | 5/2008 | Schowengerdt et al. |
| 2008/0285140 | A1 | 11/2008 | Amitai |
| 2009/0284608 | A1 | 11/2009 | Hong et al. |
| 2010/0110368 | A1 | 5/2010 | Chaum |
| 2010/0149073 | A1* | 6/2010 | Chaum et al. ............ 345/8 |
| 2011/0109880 | A1 | 5/2011 | Nummela |
| 2011/0214082 | A1 | 9/2011 | Osterhout et al. |
| 2012/0021806 | A1 | 1/2012 | Maltz |

FOREIGN PATENT DOCUMENTS

| | | |
|---|---|---|
| JP | 11249588 | 9/1999 |
| JP | 3429320 | 5/2003 |
| JP | 2003520984 | 7/2003 |
| JP | 2009282085 | 12/2009 |
| WO | 9815868 | 4/1998 |
| WO | 0127685 | 4/2001 |
| WO | 2009013693 A | 1/2009 |

OTHER PUBLICATIONS

Response to Office Action filed Oct. 16, 2012, U.S. Appl. No. 13/221,739, filed Aug. 30, 2011, 12 pages.
Canadian Office Action dated Nov. 7, 2011, Canadian Patent Application No. 2,750,287 filed Aug. 29, 2011, 3 pages.
Response to Canadian Office Action dated Jan. 31, 2012, Canadian Patent Application No. 2,750,287 filed Aug. 29, 2011, 12 pages.
Canadian Office Action dated Feb. 22, 2012, Canadian Patent Application No. 2,750,287 filed Aug. 29, 2011, 1 page.
Response to Canadian Office Action dated Feb. 28, 2012, Canadian Patent Application No. 2,750,287 filed Aug. 29, 2011, 75 pages.
Ajanki, et al. "Contextual Information Access with Augmented Reality." In Proceedings of IEEE International Workshop on Machine Learning for Signal Processing (MLSP), Aug. 29-Sep. 1, 2010, pp. 95-100: Kittila, Finland, 6 pages.
Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, Helsinki, Finland, 5 pages.
Chen et al., "Research on Eye-gaze Tracking Network Generated by Augmented Reality Application", Proceedings of the Second International Workshop on Knowledge Discovery and Data Mining, Jan. 23-25, 2009, pp. 594-597 IEEE, Moscow, Russia, 4 pages.
Ebisawa, Yoshinobu, "Unconstrained Pupil Detection Technique Using Two Light Sources and the Image Difference Method", Visualization and Intelligent Design in Engineering and Architecture II, Published 1995, 11 pages.
Gang, Wen, "Chapter 3 Gaze Estimation System", National University of Singapore, ScholarBank@NUS [online], 2004 [retrieved on Jun. 10, 2011], Retrieved from the Internet: URL:<http://scholarbank.nus.edu.sg/bitstream/handle/10635/13692/Chapter3_GazeDetectionSystem.pdf?sequence=5>,10 pages.
"Head Fixed Eye Tracking System Specifications", Arrington Research [online], Retrieved from the Internet on Jun. 10, 2011: <URL: http://www.arringtonresearch.com/techinfo.html>, 2 pages.
Hennessey, et al., "A Single Camera Eye-Gaze Tracking System with Free Head Motion", Proceedings of the 2006 Symposium on Eye Tracking Research and Applications, Mar. 27-29, 2006, pp. 87-94, ACM , New York, NY, 8 pages.
Herbelin, et al., "Coding gaze tracking data with chromatic gradients for VR Exposure Therapy", Proceedings of the 17th International Conference on Artificial Reality and Telexistence (ICAT '07), Nov. 28-30, 2007, Esbjerg, Denmark, 8 pages.
Hillaire, et al., "Using an Eye-Tracking System to Improve Camera Motions and Depth-of-Field Blur Effects in Virtual Environments", Proceedings of the 2008 Virtual Reality Conference, Mar. 8-12, 2008, pp. 47-50, IEEE: Reno, NE, USA. Retrieved from the Internet Nov. 11, 2010, URL: <http://www.irisa.fr/bunraku/GENS/alecuyer/vr08_hillaire.pdf>, 4 pages.
Kim et al., "Vision-Based Eye-Gaze Tracking for Human Computer Interface", Proceedings of the 1999 Conference on Systems, Man, and Cybernetics, Oct. 12-15, 1999, pp. 324-329, vol. 2. IEEE: Toyko, Japan, 3 pages.
Kollenberg, et al., "Visual Search in the (Un)Real World: How Head-Mounted Displays Affect Eye Movements, Head Movements and Target Detection", Proceedings of the 2010 Symposium on Eye-Tracking Research & Applications (ETRA '10), Mar. 22-24, 2010, Austin Texas, 4 pages.
Liu, et al.,"Real Time Auto-Focus Algorithm for Eye Gaze Tracking System", Proceedings of the 2007 International Symposium on Intelligent Signal Processing and Communication Systems, Nov. 28-Dec. 1, 2007, pp. 742-745, Xiamen, China, 4 pages.
Pomplun, et al., "Using Pupil Size as a Measure of Cognition Workload in Video-Based Eye-Tracking Studies", Department of Computer Science, Research Article [online], [retrieved on Jun. 10, 2011] Retrieved from the Internet: <URL: http://www.cs.umb.edu/~marc/pubs/pomplun_sunkara_fairley_xiao_draft.pdf>, 37 pages.
Reale, et al., "Viewing Direction Estimation Based on 3D Eyeball Construction for HRI", IEEE Computer Society Conference on Computer Vision and Pattern Recognition Workshops, Jun. 13-18, 2010, pp. 24-31, San Francisco, CA, IEEE Publishers, 8 pages.
Villanueva, et al., "Geometry Issues of Gaze Estimation", Advances in Human Computer Interaction, Oct. 2008, InTech, pp. 513-534, 22 pages.
ZionEyez, A Social Media Company [online], Copyright ZionEyez 2011 [retrieved on Jun. 15, 2011], Retrieved from the Internet: <URL:http://www.zioneyez.com/#/home/>, 6 pages.
U.S. Appl. No. 13/221,739, filed Aug. 30, 2011.
Preliminary Amendment dated Apr. 20, 2012, U.S. Appl. No. 13/221,739, filed Aug. 30, 2011, 10 pages.
Li, et al., "An Efficient Method for Eye Tracking and Eye-Gazed FOV Estimation," Proceedings of the 16th IEEE international conference on Image processing (ICIP'09), pp. 2597-2600, Nov. 2009, Cairo, Egypt, 4 pages.
Lin et al., "A new data processing and calibration method for an eye-tracking device pronunciation system," Optics & Laser Technology, Apr. 2002, vol. 34, pp. 405-413. Elsevier Science Ltd. New York, NY, USA, 9 pages.
"Technology: PicoP Display Engine—How it Works," MicroVision: PicoP Technology [online], Retrieved from the Internet [retrieved on Sep. 21, 2011], <URL: http://www.microvision.com/technology/picop.html>, 46 pages.
"Helmet Mounted Display (HMD) with Built-In Eye Tracker", Datasheet, National Aerospace Laboratory (NLR), Jan. 2009, Retrieved from the Internet: URL: <http://www.nlr.nl/ATTS/flyer%20HMD%20F294-03.pdf>, 4 pages.
Lee et al., "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp.

(56) References Cited

OTHER PUBLICATIONS 700-709. Retrieved from the Internet: URL: <http://delivery.acm.org/10.1145/1770000/1769669/p700-lee.pdf?key1=1769669&key2=3272740821&coll=GUIDE&dl=GUIDE&CFID=98778950& CFTOKEN=13851951>, 10 pages.

Rolland, et al., "Displays—Head-Mounted", In Encyclopedia of Optical Engineering, New York: Marcel Dekker, 2005 [retrieved on Nov. 11, 2010] Retrieved from the Internet: URL: <http://www.optics.arizona.edu/opti588/reading/HMD_Rolland_Hua_2005.pdf>, 16 pages.

Nilsson, et al., "Hands Free Interaction with Virtual Information in a Real Environment: Eye Gaze as an Interaction Tool in an Augmented Reality System", PsychNology Journal, vol. 7, No. 2, pp. 175-196, Apr. 28, 2009, 22 pages.

Handa, et al., "Development of head-mounted display with eye-gaze detection function for the severely disabled", 2008 IEEE International Conference on Virtual Environments, Human-Computer Interfaces, and Measurement Systems (VECIMS 2008), Jul. 14-16, 2008, Istanbul, Turkey, 5 pages.

International Search Report and Written Opinion dated Mar. 7, 2013 in International Patent Application No. PCT/US2012/057035, 9 pages.

U.S. Appl. No. 13/844,453, filed Mar. 15, 2013.

Notice of Allowance and Fee(s) Due dated Dec. 12, 2012, U.S. Appl. No. 13/221,739, filed Aug. 30, 2011, 11 pages.

Office Action dated Sep. 6, 2013 in U.S. Appl. No. 13/941,439, 13 pages.

Response to Office Action filed Nov. 14, 2013 in U.S. Appl. No. 13/941,439, 10 pages.

Final Office Action dated Dec. 23, 2013 in U.S. Appl. No. 13/941,439, 14 pages.

Response to Office Action filed Mar. 24, 2014 in U.S. Appl. No. 13/941,439, 10 pages.

Office Action dated May 5, 2014 in Chinese Patent Application No. 201210362802.8, with English Summary of the Office Action, 15 pages.

English Abstract of Chinese Patent Application No. CN2005800236, Publication No. CN1771454A dated May 10, 2006, 2 pages.

Notice of Allowance dated Apr. 2, 2014 in U.S. Appl. No. 13/941,439, 35 pages.

Notice of Allowance dated Sep. 5, 2014 in U.S. Appl. No. 13/941,439, 10 pages.

Response to Office Action filed Sep. 22, 2014 in Chinese Patent Application No. 201210362802.8, with English language translation of the amended claims, 13 pages.

Office Action dated Oct. 22, 2014 in Chinese Patent Application No. 201210362802.8, with English summary of the Office Action, 8 pages.

* cited by examiner

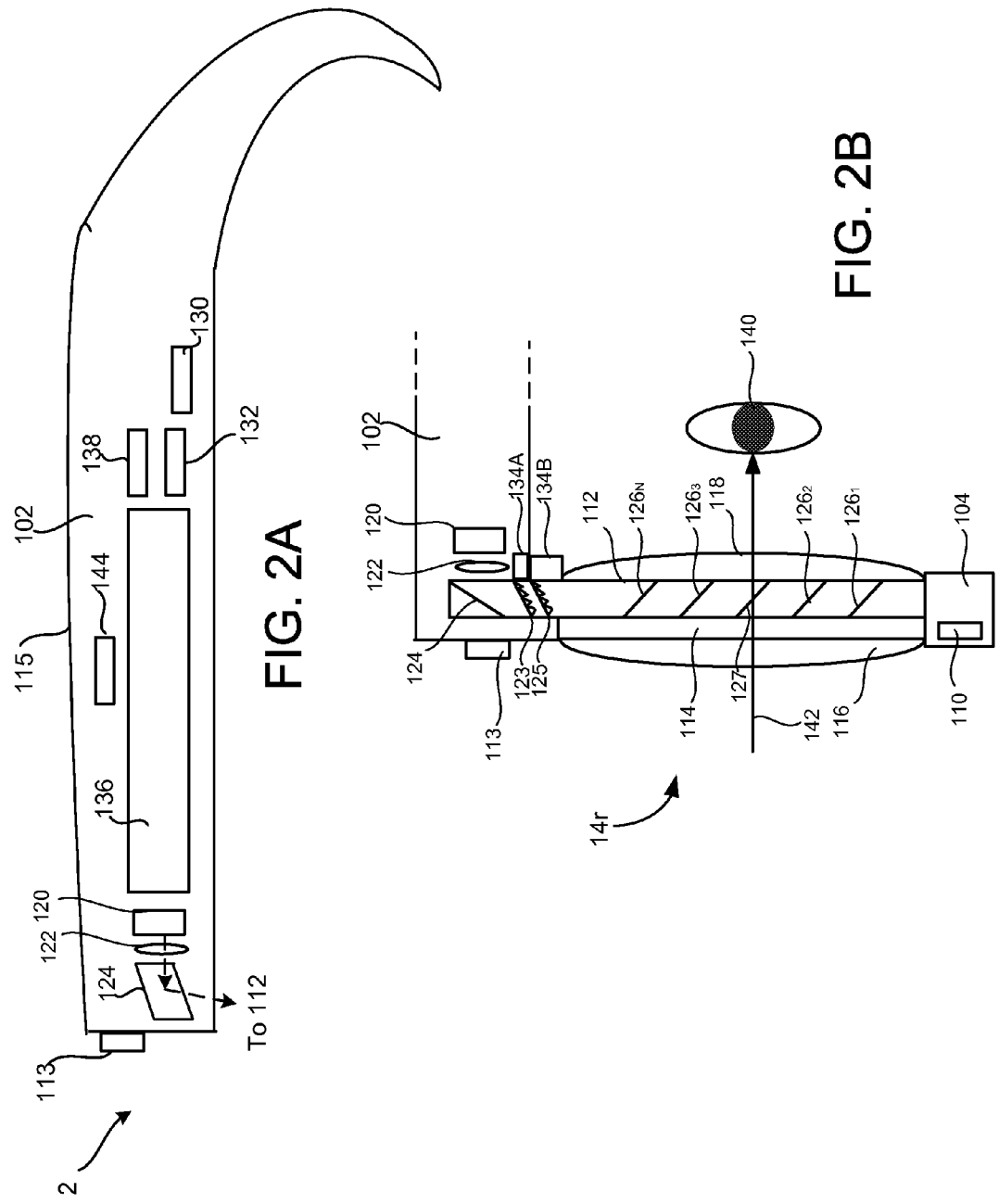

INTEGRATED EYE TRACKING AND DISPLAY SYSTEM

BACKGROUND

Mixed or augmented reality is a technology that allows virtual imagery to be mixed with a user's actual view of the real world. A feature of a see-through, mixed or augmented reality near eye, (e.g. head mounted) display device, unlike other display devices, is that the images displayed do not monopolize the user's view. With a see-through, mixed reality display device, the user can literally see through the display and interact with the real world while also seeing images generated by one or more software applications. Furthermore, the user's field of view is not stationary as a user moves his or her head. What the user is looking at in the field of view, also referred to as the user's gaze, changes as the user shifts his or her eyes, even if his or her head does not move. The ability to identify eye movements would enhance the placement of images within the display.

SUMMARY

Technology is provided for integrating eye tracking and display functions using shared optics of a see-through, near-eye, mixed reality display device. Embodiments described herein permit the eye-tracking system to illuminate and capture data along an optical axis of each display positioned to be seen through by a respective eye resulting in simpler computations, better illumination of the eye, and a higher probability of capturing more data of the eye than eye tracking sensor systems which capture data off axis and are more hindered by obstructions like droopy eyelids and styes on eyelids.

The technology provides an embodiment of an integrated eye tracking and display system for a see-through, near-eye, mixed reality display device. The system comprises, for each eye, a display optical system having an optical axis and a see-through, planar waveguide positioned to be seen through by the respective eye. One or more wavelength selective filters are positioned in the waveguide in co-axial alignment with the optical axis of the respective display optical system. The one or more filters direct infrared and visible illumination out of the respective planar waveguide. Additionally, the one or more filters direct infrared reflections into the planar waveguide. Some examples of a wavelength selective filter are fixed and active diffractive grating elements, reflective grating elements, and other reflective elements which direct radiation of a predetermined wavelength or within a range of wavelengths.

An infrared illumination source is positioned for having its infrared illumination optically coupled into the planar waveguide. An infrared sensor is optically coupled to the planar waveguide for directing infrared and visible illumination out of the planar waveguide and for receiving the infrared reflections directed from the wavelength selective filters. An image generation unit is optically coupled for transmission of visible illumination into the planar waveguide.

The technology provides another embodiment of an integrated eye tracking and display system for a see-through, near eye, mixed reality display device. As in the embodiment described above, the system embodiment comprises a display optical system for each eye. Each display optical system has an optical axis and a see-through, planar waveguide positioned to be seen through by the respective eye. One or more wavelength selective filters are positioned within the waveguide in co-axial alignment with the optical axis of the respective display optical system for directing infrared reflections into the planar waveguide. An array of optical elements including light sources for transmitting infrared and visible illumination is optically coupled to the planar waveguide for directing their illumination into the planar waveguide. An infrared sensor is optically coupled to the planar waveguide for receiving infrared reflections directed from the wavelength selective filters.

The technology provides an embodiment of a method for processing visible and infrared wavelengths for image display and eye tracking in an optical path of a see-through planar waveguide positioned to be seen through in a display optical system of a see-through, near-eye, mixed reality display device. The method comprises optically coupling visible and infrared illumination into the planar waveguide in a first direction of an optical path. The visible and infrared illumination are directed out of the planar waveguide toward the eye by one or more wavelength selective filters co-axially aligned with an optical axis of the display optical system. The filters also direct infrared reflections from the eye into the planar waveguide in a second direction of the same optical path.

The method further comprises optically coupling the infrared reflections from the planar waveguide to an infrared sensor. Data generated by the infrared sensor (e.g. charge-coupled device (CCD) or CMOS pixel sensor array) is stored as eye tracking data. Some examples of eye tracking data are image data from an IR camera or positions detected for glints by a position sensitive detector (PSD). In some embodiments the first and second direction may be the same. In other embodiments, the first direction and second direction may be different. An example of different directions are opposite directions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame in an embodiment of the see-through, mixed reality display device embodied as eyeglasses providing support for hardware and software components.

FIG. 2B is a top view of an embodiment of an integrated eye tracking and display optical system of a see-through, near-eye, mixed reality device.

FIG. 6C illustrates another exemplary layout of a linear integrated array of light sources generating both visible and infrared illumination in which infrared light sources are placed at the end of each row in an arrangement suitable for glint tracking.

FIG. 6D illustrates another exemplary layout of a linear integrated array of optical elements including infrared sensing elements, visible light sources and infrared light sources at the end of visible light rows in an arrangement suitable for glint tracking.

DETAILED DESCRIPTION

Figure 1:
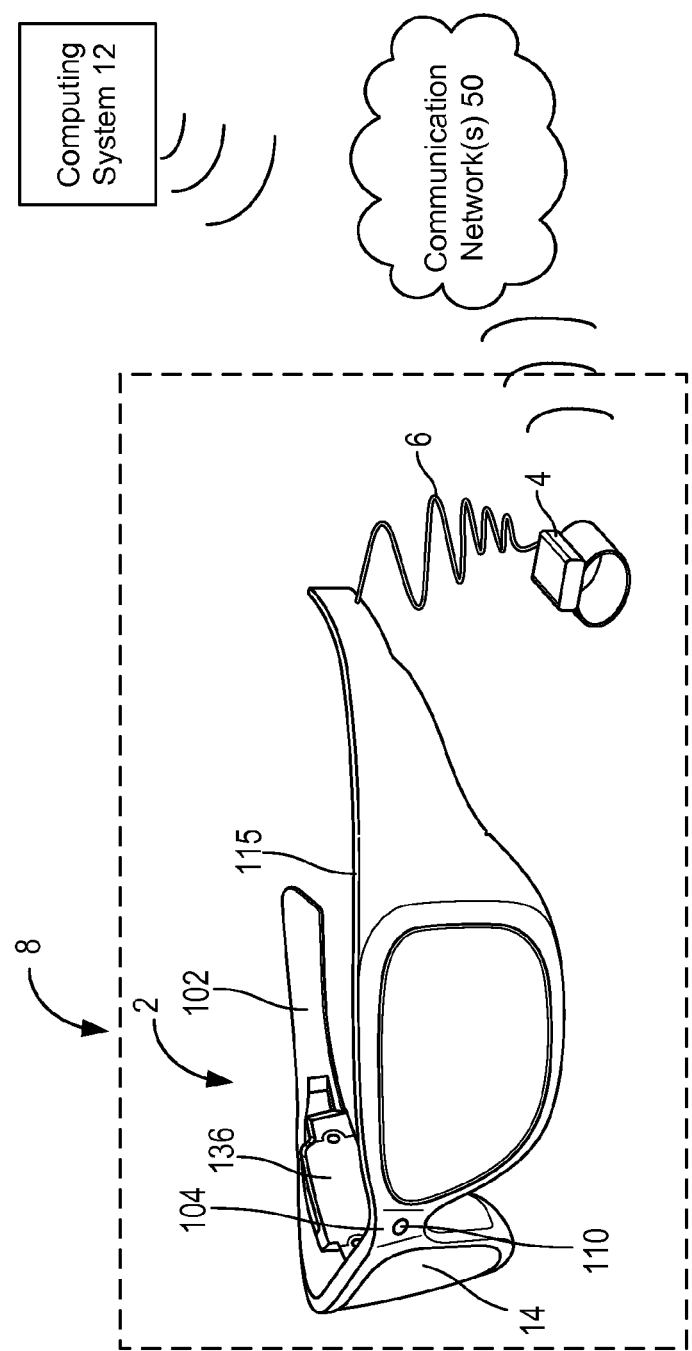
FIG. 1 is a block diagram depicting example components of one embodiment of a see-through, mixed reality display device system.

Embodiments of a see-through, near-eye, head mounted mixed reality display device system with an integrated eye tracking and display system are described. The eye tracking system shares portions of a see through head mounted display (HMD) optical path to project the eye tracking infrared illumination to the eye and to capture infrared reflections from the eye by an infrared sensor. An eye tracking system uses infrared (IR) illumination so that the illumination is not visible to the user. The IR sensor may be an IR camera which provides infrared image data of the eye or an IR sensor which detects glints or reflections off the cornea of the eye generated by IR illumination of the eye.

In the embodiments described below, there is a display optical system for each eye which includes a see-through, planar waveguide. The waveguide provides an optical path in a practical implementation based on the operating principle of total internal reflection. One or more wavelength selective filters are positioned in the waveguide in co-axial alignment with an optical axis of the display optical system. The optical axis of the display system is co-axially, or closely approximates being co-axially, with a nominal eye line of sight. A nominal eye line of sight is centered on the pupil and extends from the pupil center when the user is looking straight ahead. Due to the co-axial alignment of the one or more filters and the optical axis, visible illumination representing images and infrared illumination are directed out of the waveguide along the optical axis toward the eye, and reflections from the eye centered about the optical axis are directed into the waveguide. Iluminating the eye and capturing reflections from the eye centered around the optical axis, which is approximating the eye line of sight, simplifies image processing algorithms for eye image data and is more tolerant of individualistic differences in human facial features. For example a stye on the eye or a low eyelid may block illumination directed from an upper corner of an eyeglass frame embodiment more so than if the illumination is directed along the optical axis of a respective display for the eye.

The better illumination and eye data capture centered at the optical axis can improve the results of many applications such as corneal glint tracking and pupil tracking for gaze determination, blinking tracking for user command interpretation, iris scanning and retinal vein tracking for biometric identification based applications, measuring convergence, identifying pupil alignment with an optical axis and determining interpupillary distance (IPD), and structured light pattern techniques for cornea tracking. For examples of some of these applications which would benefit from the embodiments presented below, please see the following: Lewis et al., U.S. patent application Ser. No. 13/221,739, entitled "Gaze Detection in a See-Through, Near-Eye, Mixed Reality Display,", Lewis et al., U.S. patent application Ser. No. 13/221,662 "Aligning Inter-Pupillary Distance in a Near-Eye Display System," Lewis et al., U.S. patent application Ser. No. 13/221,707 "Adjustment of a Mixed Reality Display for Inter-Pupillary Distance Alignment," and Perez et al., U.S. patent application Ser. No. 13/221,669 "Head Mounted Display with Iris Scan Profiling."

FIG. 1 is a block diagram depicting example components of one embodiment of a see-through, mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. For example, processing unit 4 may be embodied in a mobile device like a smart phone, tablet or laptop computer. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

FIG. 2A is a side view of an eyeglass temple 102 of the frame 115 in an embodiment of the see-through, mixed reality display device embodied as eyeglasses providing support for hardware and software components. At the front of frame 115 is physical environment facing or outward facing video camera 113 that can capture video and still images which are transmitted to the processing unit 4.

The data from the camera may be sent to a processor 210 of the control circuitry 136, or the processing unit 4 or both, which may process them but which the unit 4 may also send to one or more computer systems 12 over a network 50 for processing. The processing identifies and maps the user's real world field of view.

Control circuits 136 provide various electronics that support the other components of head mounted display device 2. More details of control circuits 136 are provided below with respect to FIG. 3A. Inside, or mounted to temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside temple 102 is an image source or image generation unit 120. In one embodiment, the image source includes micro display 120 for projecting images of one or more virtual objects and lens system 122 for directing images from micro display 120 into a see-through planar waveguide 112. Lens system 122 may include one or more lenses. In one embodiment, lens system 122 includes one or more collimating lenses. In the illustrated example, a reflecting element 124 receives the images directed by the lens system 122 and optically couples the image data into the planar waveguide 112.

There are different image generation technologies that can be used to implement micro display 120. For example, micro display 120 can be implemented using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. Digital light processing (DLP), liquid crystal on silicon (LCOS) and Mirasol® display technology from Qualcomm, inc. are all examples of reflective technologies. Additionally, micro display 120 can be implemented using an emissive technology where light is generated by the display, see for example, a PicoP™ display engine from Microvision, Inc. Another example of emissive display technology is a micro organic light emitting diode (OLED) display. Companies eMagin and Microoled provide examples of micro OLED displays.

FIG. 2B is a top view of an embodiment of a display optical system 14 of a see-through, near-eye, augmented or mixed reality device. A portion of the frame 115 of the near-eye display device 2 will surround a display optical system 14 for providing support for one or more optical elements as illustrated here and in the following figures and for making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a planar waveguide 112, an optional opacity filter 114, see-through lens 116 and see-through lens 118. In one embodiment, opacity filter 114 is behind and aligned with see-through lens 116, planar waveguide 112 is behind and aligned with opacity filter 114, and see-through lens 118 is behind and aligned with planar waveguide 112. See-through lenses 116 and 118 may be standard lenses used in eye glasses and can be made to any prescription (including no prescription). In some embodiments, head mounted display device 2 will include only one see-through lens or no see-through lenses. Opacity filter 114, which is aligned with planar waveguide 112, selectively blocks natural light, either uniformly or on a per-pixel basis, from passing through planar waveguide 112. For example, the opacity filter enhances the contrast of the virtual imagery. More details of an opacity filter are provided in U.S. patent application Ser. No. 12/887,426, "Opacity Filter For See-Through Mounted Display," filed on Sep. 21, 2010, incorporated herein by reference in its entirety.

The planar waveguide 112 transmits visible light from micro display 120 to the eye 140 of the user wearing head mounted display device 2. The see-through planar waveguide 112 also allows visible light from in front of the head mounted display device 2 to be transmitted through itself 112 to eye 140, as depicted by arrow 142 representing an optical axis of the display optical system 14r, thereby allowing the user to have an actual direct view of the space in front of head mounted display device 2 in addition to receiving a virtual image from the micro display 120. Thus, the walls of planar waveguide 112 are see-through. Planar waveguide 112 includes a first reflecting surface 124 (e.g., a mirror or other surface). Visible light from micro display 120 passes through lens 122 and becomes incident on reflecting surface 124. The reflecting surface 124 reflects the incident visible light from the micro display 120 such that visible light is trapped inside a planar, substrate comprising planar waveguide 112 by internal reflection as described further below.

Infrared illumination and reflections, also traverse the planar waveguide 112 for an eye tracking system 134 for tracking the position of the user's eyes. A user's eyes will be directed at a subset of the environment which is the user's area of focus or gaze. The eye tracking system 134, comprises an eye tracking illumination source 134A in this example located on temple 102 and an eye tracking IR sensor 134B positioned between lens 118 and temple 102. The technology allows flexibility in the placement of entry and exit optical couplings to and from the waveguide's optical path for the image generation unit 120, the illumination source 134A and the IR sensor 134B. The visible illumination representing images and the infrared illumination may enter from any direction about the waveguide 112, and one or more wavelength selective filters (e.g. 127) direct the illumination out of the waveguide centered about the optical axis 142 of the display optical system 14. Similarly, the placement of the IR sensor is flexible as long as it is optically coupled to receive infrared reflections directed by one or more wavelength selective filters positioned to receive infrared reflections along the optical axis 142.

In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking sensor 134B may be an IR camera or an IR position sensitive detector (PSD) for tracking glint positions.

In this embodiment, a wavelength selective filter 123 is embodied as a grating 123 which passes through visible spectrum light from the micro display 120 via reflecting surface 124 and directs the infrared wavelength illumination from the eye tracking illumination source 134A into the planar waveguide 112 where the IR illumination is internally reflected within the waveguide until reaching another wavelength selective filter 127 aligned with the optical axis 142. The grating 123 may be a diffraction grating or a reflection grating. In this example, the IR sensor 134B is also optically coupled to a grating 125, which may also be a diffraction grating or a reflection grating. These gratings are stacked. However, at least grating 125 is unidirectional in that grating 125 passes through the IR illumination from source 134A in the optical path heading in the direction of the nose bridge 104, but directs infrared radiation including infrared reflections traveling from the optical axis 142 towards the grating 125 out of the waveguide 112 to the IR sensor 134B. In some examples, a grating may be a fixed diffractive element like an air space grating, a fixed reflective grating, or an active or switchable grating for either diffraction, reflection or a combination of these for different wavelengths.

From the IR reflections, the position of the pupil within the eye socket can be identified by known imaging techniques when the IR sensor is an IR camera, and by glint position data when the IR sensor is a type of position sensitive detector (PSD).

After coupling into the waveguide 112, the visible illumination representing the image data from the micro display 120 and the IR illumination are internally reflected within the waveguide 112. In the example of FIG. 2B, the planar waveguide is a reflective array planar waveguide. Other types of planar waveguides may also be used, for example, a diffractive optical element planar waveguide or a planar waveguide with total internal reflection (TIR) grooves. In the example of FIG. 2B, after several reflections off the surfaces of the substrate, the trapped visible light waves reach an array of wavelength selective filters embodied in this example as selectively reflecting surfaces $12_{6_1}$ to $12_{6_N}$. Additionally, a wavelength selective filter 127 aligned with the optical axis of the display optical system is also positioned in the waveguide 112. Reflecting surfaces 126 couple visible light wavelengths incident upon those reflecting surfaces out of the substrate directed in the direction of the eye 140 of the user.

The reflecting surfaces 126 also pass infrared radiation within the waveguide. However, aligned with the optical axis 142 of the display optical system 14r, is one or more wavelength selective filters 127 which direct not only visible illumination but received infrared illumination from the illumination source 134A. For example, if the reflecting elements $126_1$ to $126_N$ are each reflecting different portions of the visible spectrum, the one or more selective filters 127 may reflect wavelengths in the red visible spectrum and the infrared spectrum. In other embodiments, the filters 127 can reflect wavelengths covering the entire visible spectrum or a larger portion thereof and the infrared spectrum for wavelengths of IR reflections and those generated by the IR illumination source.

Additionally the one or more wavelength selective filters 127 direct infrared reflections from the eye which pass through the see-through walls of the planar waveguide centered about the optical axis 142 into the optical path of the planar waveguide but in an opposite direction towards the wavelength selective filter 125 which selectively filters the infrared reflections from the waveguide and directs them to the IR sensor 134B. The filters 127 may include a bidirectional infrared filter. Additionally, visible and infrared filters may be stacked in the direction from lens 116 to 118 so that they are all co-axial with the optical axis. For example, a bidirectional hot mirror placed in front of a visible reflecting element with respect to the eye lets visible light pass but reflects IR wavelengths. Additionally, the one or more filters 127 may be embodied as an active grating which is modulated between filtering wavelengths in the visible and infrared spectrums. This would be done at a rate fast enough for the human eye not to detect.

Figure 2C:
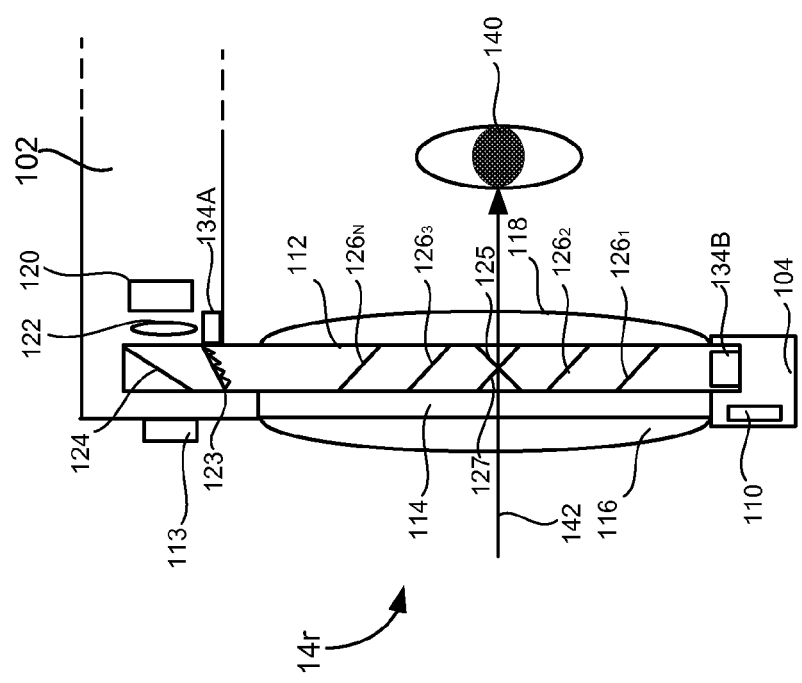
FIG. 2C is a top view of another version of the embodiment of FIG. 2B in which infrared reflections traverse the waveguide 112 in the same direction, rather than a reverse direction, as the IR illumination traveled.

FIG. 2C is a top view of another version of the embodiment of FIG. 2B in which infrared reflections traverse the waveguide 112 in the same direction, rather than a reverse direction, as the IR illumination traveled. In this embodiment, the IR sensor 134B is positioned in the nose bridge 104. In addition to the wavelength selective filter 127 directing the IR illumination toward the eye, another wavelength selective filter 125 is embodied as an IR reflecting element which passes visible light through the waveguide and also directs IR reflections received about the optical axis 142 into the waveguide and toward the IR sensor 134B. An example of such an IR reflecting element 125 is a hot mirror embodiment. In other examples, a diffractive or reflective grating may also be used. Additionally, sensor 134B is in a portion of the waveguide 112 located within the nose bridge 104 so as not to obstruct the user field of view. An electrical connection (not shown) can be made to the sensor 134B in the nose bridge portion to readout the sensor data.

In one embodiment, each eye will have its own planar waveguide 112. When the head mounted display device has two planar waveguides, each eye can have its own micro display 120 that can display the same image in both eyes or different images in the two eyes. In another embodiment, there can be one planar waveguide with two optical axes, one for each eye, which spans the nose bridge and reflects visible light into both eyes.

In the embodiments above, the specific number of lenses shown are just examples. Other numbers and configurations of lenses operating on the same principles may be used. Additionally, FIGS. 2A, 2B and 2C only show half of the head mounted display device 2. A full head mounted display device would include, for example, another set of see through lenses 116 and 118, another opacity filter 114, another planar waveguide 112 with one or more wavelength selective filters 127, another micro display 120, another lens system 122 physical environment facing camera 113 (also referred to as outward facing or front facing camera 113), eye tracking assembly 134, earphone 130, gratings 123, 125, and temperature sensor 138. Additional details of a head mounted display 2 are illustrated in U.S. patent application Ser. No. 12/905, 952 entitled Fusing Virtual Content Into Real Content, Filed Oct. 15, 2010, fully incorporated herein by reference.

Figure 3A:
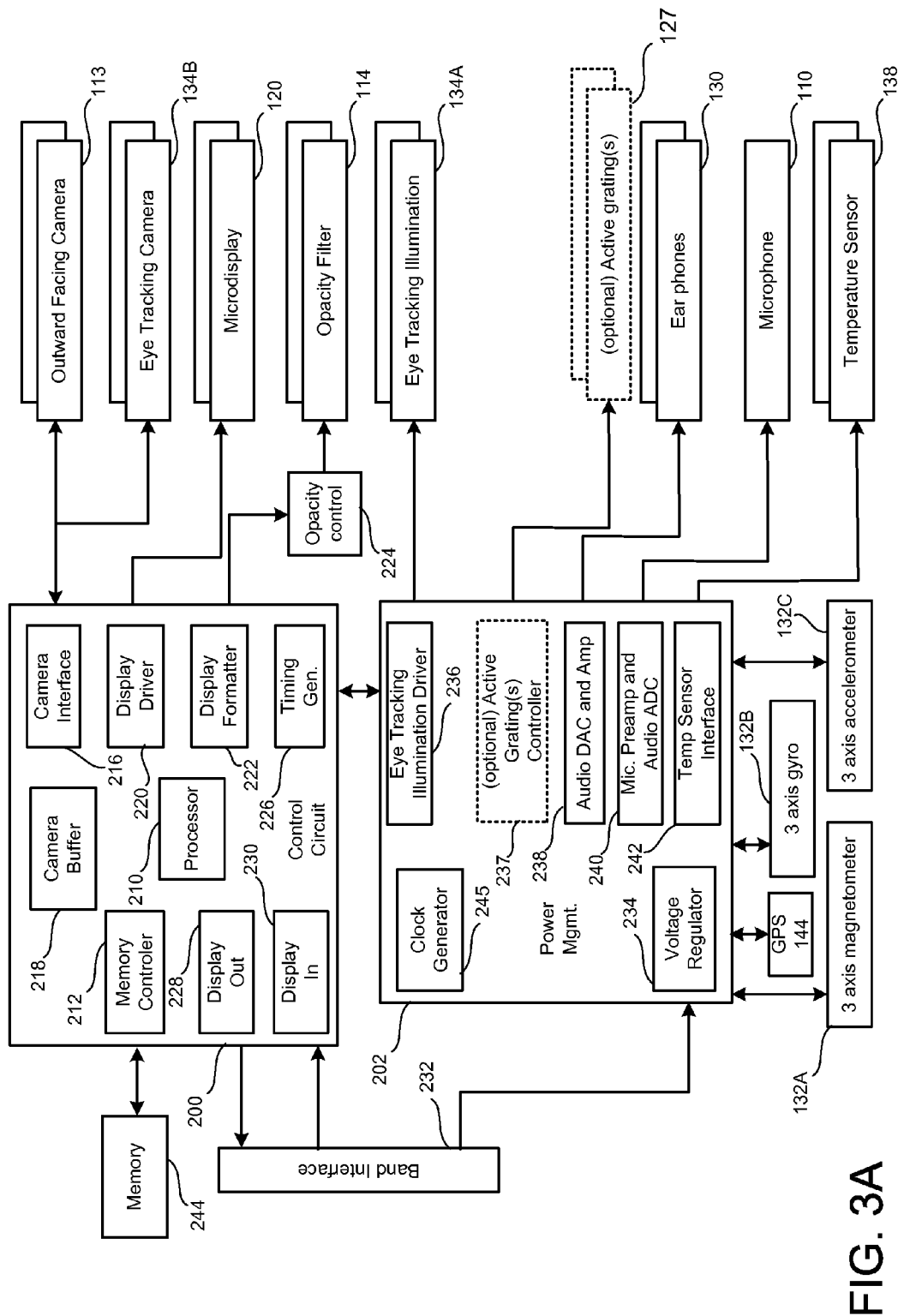
FIG. 3A is a block diagram of one embodiment of hardware and software components of a see-through, near-eye, mixed reality display device as may be used with one or more embodiments.
Figure 3B:
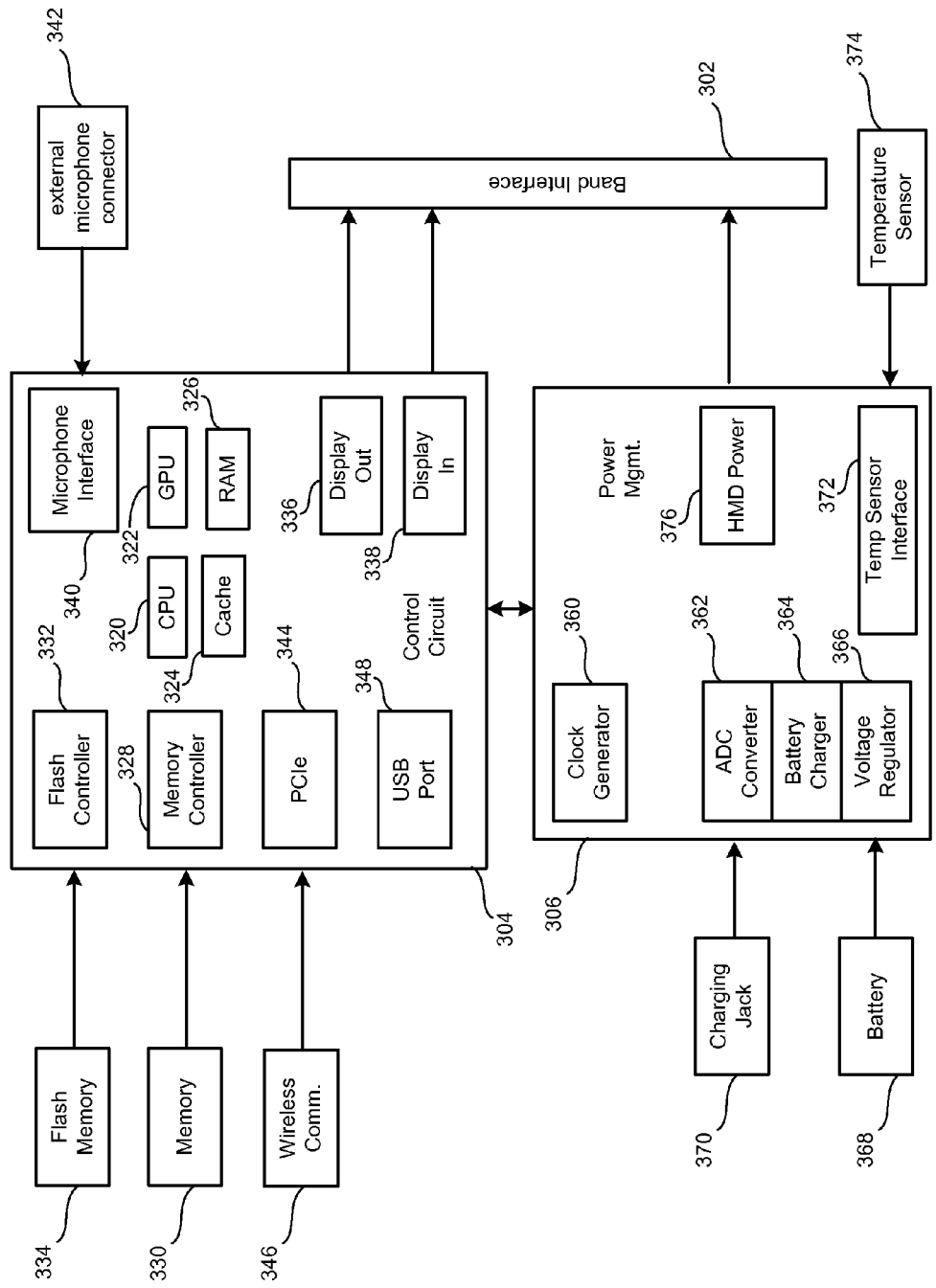
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4. In this embodiment, near-eye display device 2, receives instructions about a virtual image from processing unit 4 and provides data from sensors back to processing unit 4. Software and hardware components which may be embodied in a processing unit 4, for example as depicted in FIG. 3B, receive the sensory data from the display device 2 and may also receive sensory information from a computing system 12 over a network 50. Based on that information, processing unit 4 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, optional active gratings 127 for implementing at least one of the one or more wavelength selective filters 127, and temperature sensor 138 are shown in shadow to indicate that there are at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 are in communication with processor 210.

Camera interface 216 provides an interface to the two physical environment facing cameras 113 and, in this embodiment, an IR camera as sensor 134B and stores respective images received from the cameras 113, 134B in camera buffer 218. Display driver 220 will drive microdisplay 120. Display formatter 222 may provide information, about the virtual image being displayed on microdisplay 120 to one or more processors of one or more computer systems, e.g. 4 and 12 performing processing for the mixed reality system. The display formatter 222 can identify to the opacity control unit 224 transmissivity settings with respect to the display optical system 14. Timing generator 226 is used to provide timing data for the system. Display out interface 228 includes a buffer for providing images from physical environment facing cameras 113 and the eye cameras 134B to the processing unit 4. Display in interface 230 includes a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242, active grating controller 237, and clock generator 245. Voltage regulator 234 receives power from processing unit 4 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Active grating controller 237 receives data indicating one or more wavelengths for which each active grating 127 is to act as a selective wavelength filter. Power management unit 202 also provides power and receives data back from three axis magnetometer 132A, three axis gyro 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, wireless USB (WUSB) communication device, RFID communication device etc. The wireless communication component 346 thus allows peer-to-peer data transfers with for example, another display device system 8, as well as connection to a larger network via a wireless router or cell tower. The USB port can be used to dock the processing unit 4 to another display device system 8. Additionally, the processing unit 4 can dock to another computing system 12 in order to load data or software onto processing unit 4 as well as charge the processing unit 4. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Figure 4:
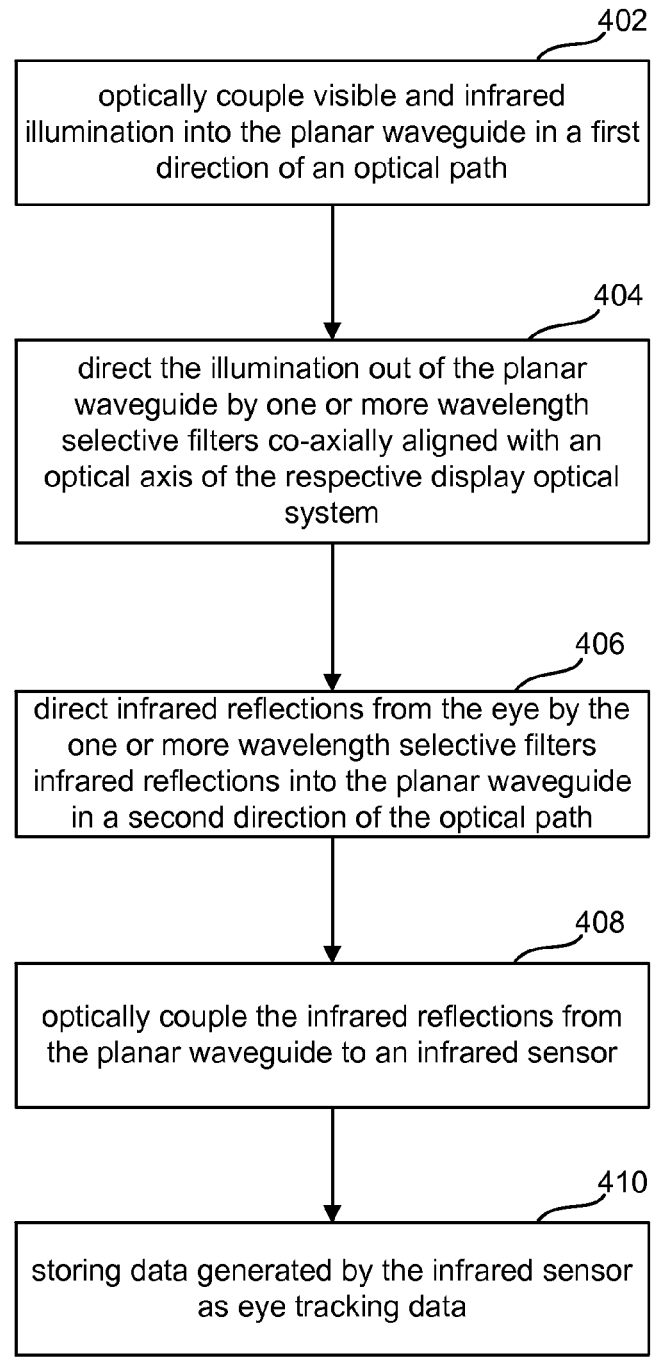
FIG. 4 is a flowchart of an embodiment of a method for processing visible and infrared wavelengths for image display and eye tracking in an optical path of a see-through, planar waveguide positioned to be seen through in a display optical system of a see-through, near-eye, mixed reality display device.

Before proceeding to other system embodiments, FIG. 4 is a flowchart of an embodiment of a method for processing visible and infrared wavelengths for image display and eye tracking in an optical path of a see-through, planar waveguide positioned to be seen through in a display optical system of a see-through, near-eye, mixed reality display device. In step

402, visible and infrared illumination are optically coupled into the planar waveguide in a first direction of an optical path. For example in FIGS. 2B and 2C, reflective element 124 couples visible light into the waveguide, and grating 123 couples IR illumination into the waveguide toward the elements 126 and the one or more filters 127. In step 404, the one or more wavelength selective filters co-axially aligned with an optical axis of the respective display optical system are directed out of the planar waveguide toward the eye. See, for example, grating 127 in FIG. 2B and grating 125 in FIG. 2C. By directing the IR illumination along the optical axis, the illumination is centered on the eye providing the most illumination of the pupil for tracking or the iris for scanning. Again, there is an assumption that the optical axis of the display optical system is aligned, or most closely aligned, with the user's pupil when looking straight ahead.

In step 406, one or more wavelength selective filters (e.g. 127, 125) direct infrared reflections from the eye into the planar waveguide in a second direction of the same optical path. In step 408, the infrared reflections are optically coupled from the planar waveguide to an infrared sensor. In step 410, data generated by the infrared sensor (e.g. charge-coupled device (CCD) or CMOS pixel sensor array) is stored as eye tracking data. Some examples of eye tracking data are image data from an IR camera or positions detected for glints by a position sensitive detector (PSD). In some embodiments the first and second direction may be the same as in FIG. 2C. In other embodiments, the first direction and second direction may be different as in FIG. 2B. An example of different directions are opposite directions.

Figure 5A:
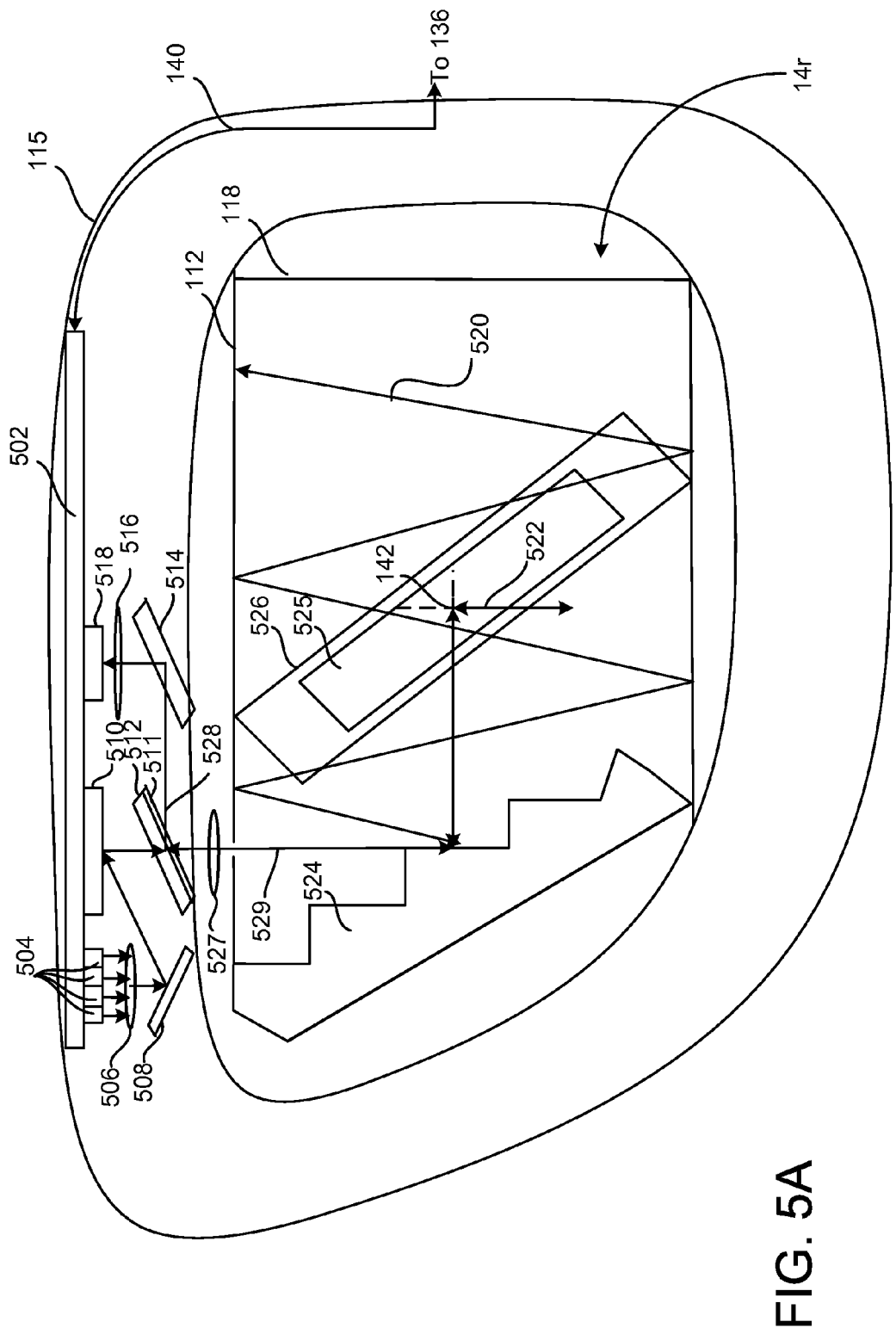
FIG. 5A is a view from the perspective of an eye looking through a planar waveguide of another embodiment of an integrated eye tracking and display optical system using an integrated linear array of light sources and a scanning mirror for generating an image.

FIG. 5A is a view from the perspective of an eye looking through a planar waveguide of another embodiment of an integrated eye tracking and display optical system using an integrated linear array of light sources and a scanning mirror for generating an image.

In this embodiment, an integrated array of light sources 504 and an IR sensor 516 are electrically connected to an electronics module, for example a printed circuit board (PCB) 502, positioned in the brow of frame 115 above a display optical system 14. The electronics module is connected via electrical connections 140 to control circuitry 136. The display optical system 14 includes at least one see-through lens 118 and a see through planar waveguide 112. In this embodiment, the waveguide 112 may be embodied as a TIR grooved planar waveguide.

The image generation unit is embodied by the integrated array of light sources 504, optical element 508, a beam combiner 506, a scanning mirror 510, and an optical coupler 512. The electronics module 502 as described in FIG. 9 below determine and set the output wavelengths of the different visible light sources for generating an image. Additionally, the light sources include an infrared illuminator for generating the infrared illumination for eye tracking. The output of the light sources 504, for example integrated LEDs or lasers (e.g. VCSELS), are combined into a combined beam by beam combiner 506 and optically coupled by optical element 508, e.g. a reflecting element, to scanning mirror 510. In some embodiments, the scanning mirror may be implemented with microelectromechanical systems (MEMS) technology. The mirror may be moved to direct the received illumination along one axis for one-dimensional scanning or along two axes, e.g. horizontal and vertical axes, for two-dimensional scanning. The layout of the array is discussed next before returning to the optical coupling of the illumination into the planar waveguide.

Figure 6A:
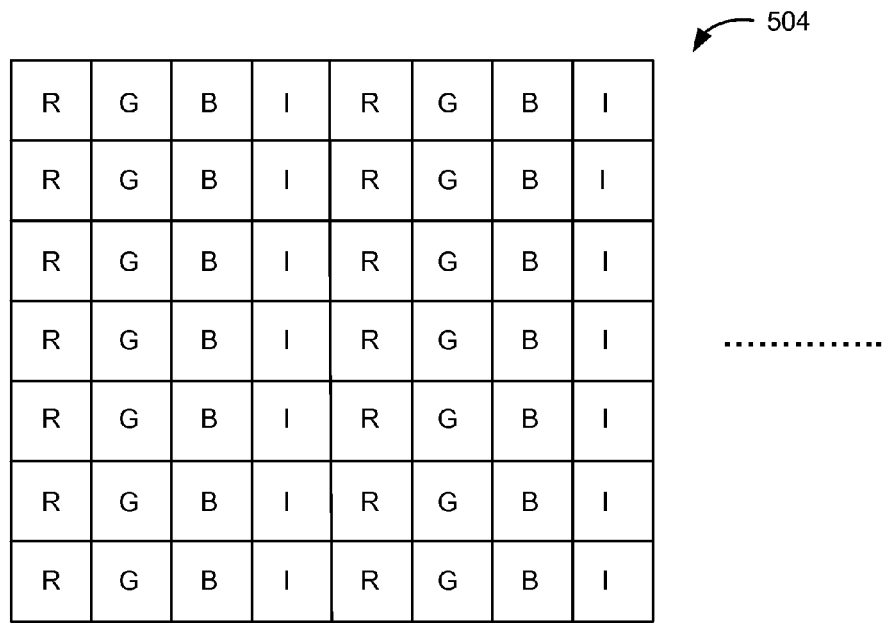
FIG. 6A illustrates an exemplary layout of a linear integrated array of light sources generating both visible and infrared illumination for use in an integrated eye tracking and display optical system of a see-through, near-eye, mixed reality device.

FIG. 6A illustrates an exemplary layout of a linear integrated array of light sources generating both visible and infrared illumination for use in an integrated eye tracking and display optical system of a see-through, near-eye, mixed reality device. As shown in the example of FIG. 6A, the array of light sources 504 may be implemented as a linear integrated array of visible light sources, e.g. LEDs or VCSELS. In this example, lines of red, represented by "R", green represented by "G" and blue represented by "B" are used. Other color ranges may be used such as cyan, magenta, and yellow. In other examples, each visible light source may be individually modulated to any color of the visible spectrum. Additionally, the array includes a line of infrared illuminators represented by "I." The array lines repeat for the size of the array. So the image generation illuminators and the eye tracking illuminators are combined in one integrated array unit.

In this example, the lines of red, green, blue and the infrared illuminators are in columns, and the rows are scanned. Each of the red, blue and green light sources are modulated to represent a segment of an image, for example a picture element such as a pixel. Each set of red, green, blue, and infrared in a line may correspond to a segment of the image. The output of the integrated linear array 504 passes to the beam combiner 506 and the optical element 508 which directs the combined beam of both the visible an IR illumination to the scanning mirror 510.

In other examples, there may be fewer or more infrared illuminators interspersed with the visible light sources. For example, there may be one IR illuminator for every twenty (20) visible illuminators. Such an arrangement may be used for an application based on structured lighting.

FIG. 6C illustrates another exemplary layout of a linear integrated array of light sources generating both visible and infrared illumination in which infrared light sources are placed at the end of each row in an arrangement suitable for glint tracking. Glints are reflections off one or more surfaces of the cornea. As the user's eye moves, the specular reflectivities of different eye parts like the pupil, the iris and the sclera, affect the intensity value for each glint received at an IR sensor such as a position sensitive detector (PSD) or photodetector. Pupil position can be determined from the glint data values generated by the sensor.

The scanning mirror 510 scans each row and reflects each row onto an optical surface 512 thus reproducing the image on a surface of optical element 512. Column by column scanning may also be used in other examples. Row by row scanning is an example of one dimensional scanning which use of the linear array allows. Embodiments with two dimensional scanning may also be used if desired. In the direction of the optical path from the illuminators to the planar waveguide 112, visible and infrared wavelengths pass through the optical element 512. As discussed below, the other side of the optical element 512 includes a unidirectional wavelength selective filter 511 for infrared wavelengths in order to direct infrared reflections in an optical path direction to the infrared sensor 518. Optical coupler, e.g. one or more collimating lenses, 527 couples the image and IR illumination into the waveguide 112.

In this example, a grating 524 diffracts the visible and IR illumination in the planar waveguide for total internal reflection. In one example, grating 524 may be implemented using stacked gratings, one for directing visible spectrum wavelengths and another for direction IR radiation. For example a hot mirror may be stacked above the surface of a visible spectrum reflecting element. Additionally, the grating 524 in this example includes a bidirectional IR reflective grating in order to couple IR reflections along path 529 to the wavelength selective filter 511 (e.g. a hot mirror) of optical element 512 and to reflect IR illumination to an IR wavelength selective filter 525 positioned co-axially with the optical axis 142 of the display optical system.

In this example, stacked gratings 526 and 525 are both aligned co-axially with the optical axis 142. Grating 526 which directs visible light out of the waveguide along optical axis 142 is behind grating 525 which directs, e.g. by diffraction or reflection, infrared illumination out of the waveguide, and directs IR reflections received into the waveguide. Arrow 522 representing the IR illumination coming out of the waveguide, out of the page in this example, and IR reflections going into the waveguide, into the page in this example, centered about the optical axis 142. In some examples, to better decrease backscattered IR illumination in the IR reflections, both the visible grating 526 and the IR grating 525 may have an IR blocking coating on their longer right side surfaces to block IR illumination being internally reflected back to the grating 524.

The IR grating 525 is bidirectional in this example, and directs the infrared reflections back to the grating 524 which is also bidirectional for infrared wavelengths. The IR reflections 529 are directed back to wavelength selective filter 511 of the optical element 512 which directs the IR reflections to another IR wavelength selective filter 514 (e.g. hot mirror, reflection grating, diffraction grating) which directs the IR reflections 528 through a coupling lens 516 to IR sensor 518.

Figure 5B:
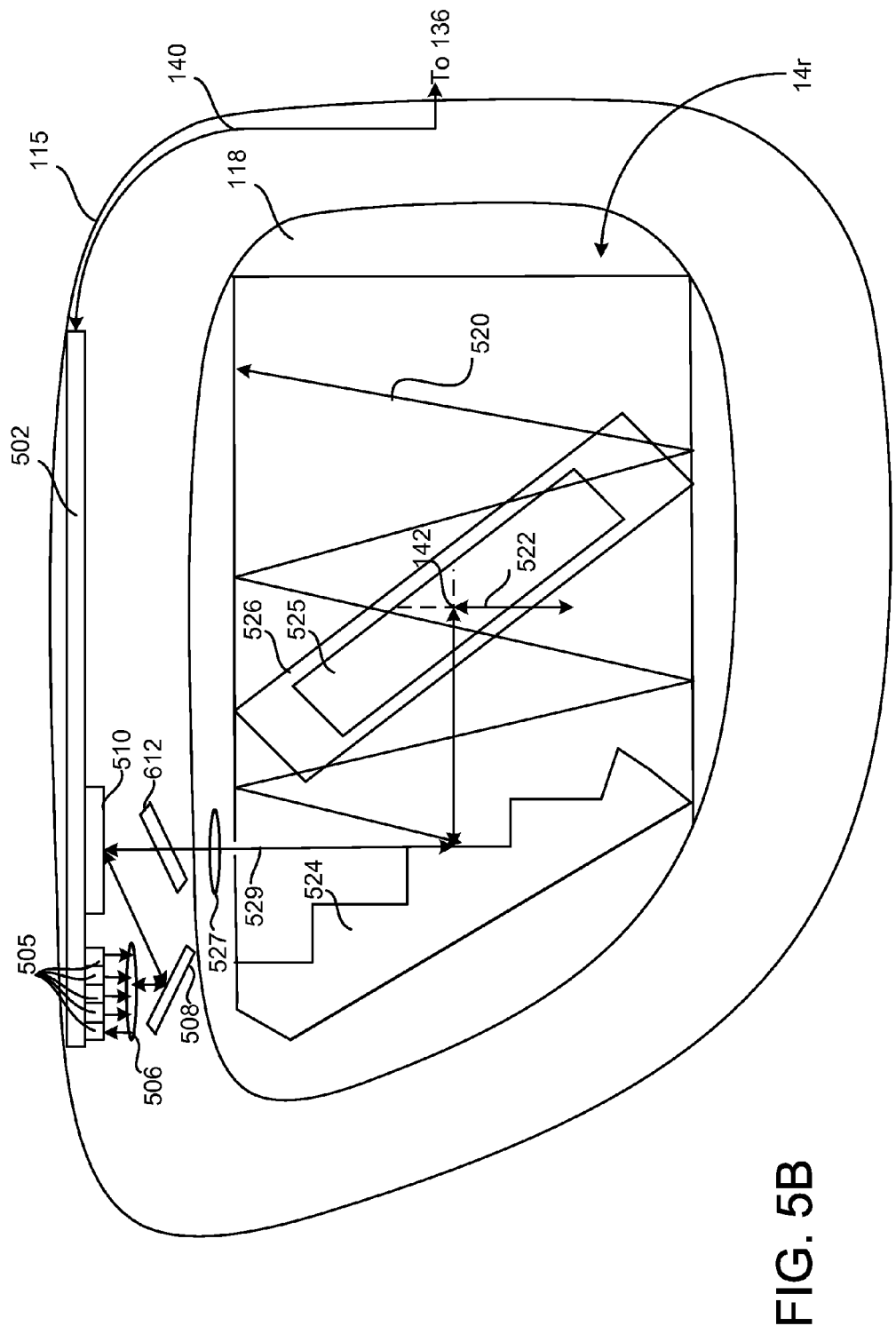
FIG. 5B illustrates another version of the embodiment of FIG. 5A in which infrared sensing elements are integrated into the array of light sources.
Figure 6B:
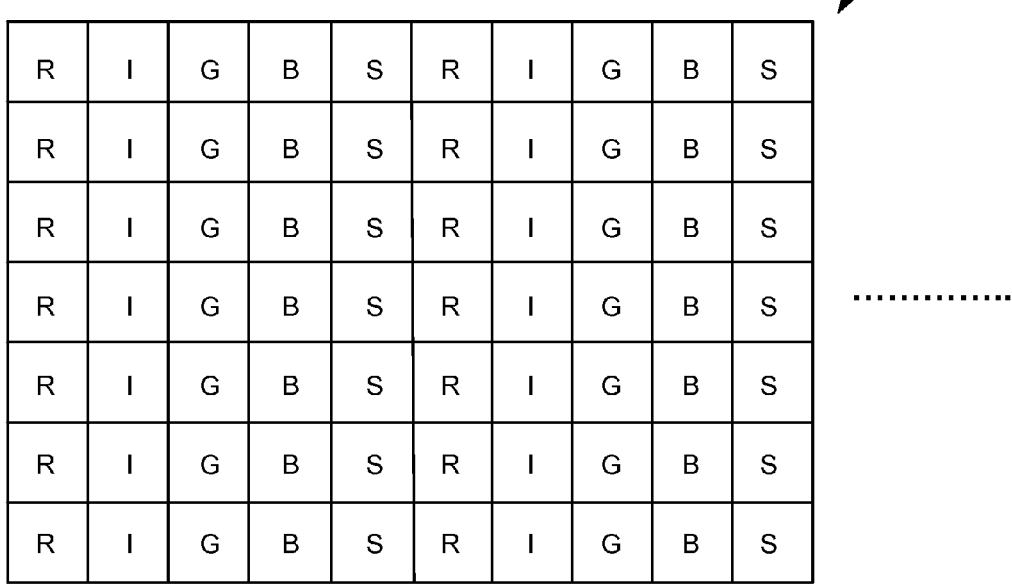
FIG. 6B illustrates an exemplary layout of a linear integrated array of optical elements including infrared sensing elements and light sources generating both visible and infrared illumination for use in an integrated eye tracking and display optical system of a see-through, near-eye, mixed reality device.
Figures 6C, 6D:
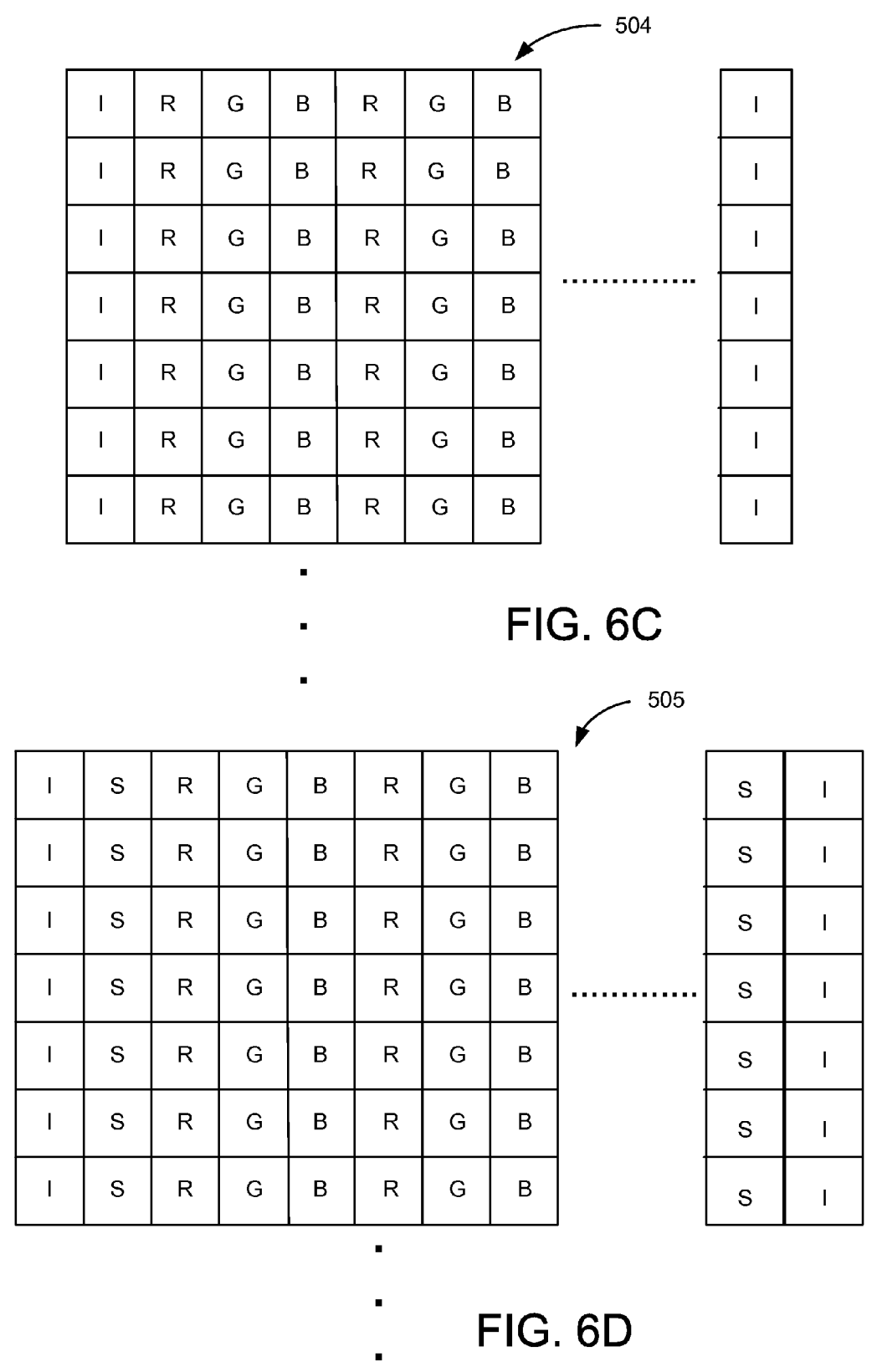

FIG. 5B illustrates another version of the embodiment of FIG. 5A in which the integrated array is an array of optical elements in which infrared sensing elements are integrated into the array of light sources. FIG. 6B illustrates an exemplary layout of a linear integrated array of optical elements including infrared sensing elements and light sources generating both visible and infrared illumination for use in an integrated eye tracking and display optical system of a see-through, near-eye, mixed reality device.

In the illustrated example, an array of optical elements 505 includes lines of IR sensing elements represented by "S." In some examples, the IR sensing elements "S" may be integrated photodetectors. For both the array of light sources 504 and the array of optical elements 505, the order of the represented lines of illuminators is flexible. For example, the order of red, green, blue, infrared is used for the array 504 in FIG. 6A while the order of red, infrared, green, sensor, blue is used in FIG. 6B.

Other geometries may be used for the integrated array of light sources. For example, instead of lines of light sources, there may be sets or clusters of light sources. Each set may include color light sources and an IR light source and, if using the arrangement of optical elements, an IR sensor as well. Examples of the geometrical arrangement of each set may be a square, a circle, or a rectangle. In this embodiment, the visible and infrared illumination are coupled into the waveguide as discussed above for the embodiment of FIG. 5A. As the infrared reflections are to be directed back to the integrated array of optical elements, in this embodiment, the optical element 612 upon which the scanning mirror 510 reproduces the image by reflecting the visible illumination may be a passthrough optical element. The IR reflections from the grating 524 pass through optical element 612. As the reflections travel at the speed of light, the scanning mirror 510 reflects the IR reflections back to the bidirectional reflecting element 508 in a reverse path which proceeds through the beam combiner 506 and back to the array 505 of optical elements including the infrared sensing elements, "S" elements. The sensing elements generate electrical signals responsive to the IR photons received. The electrical signals are converted to representative data signals which are transferred (e.g. electrical connections 140) by the electronics module 502 to the one or more processors of the control circuitry 136 and the processing unit 4 for applications like gaze determination, biometric monitoring and biometric identification.

FIG. 6D illustrates another exemplary layout of a linear integrated array of optical elements including infrared sensing elements, visible light sources and infrared light sources "I" and infrared sensing elements "S" positioned at the end of visible light source rows in an arrangement suitable for glint tracking. The processing discussed above for the embodiment of FIG. 5B also applies to such an embodiment using an integrated array of optical elements like in FIG. 6D. As in the example of FIG. 6B, the IR sensing elements may be integrated photodetectors in some examples.

Figure 7A:
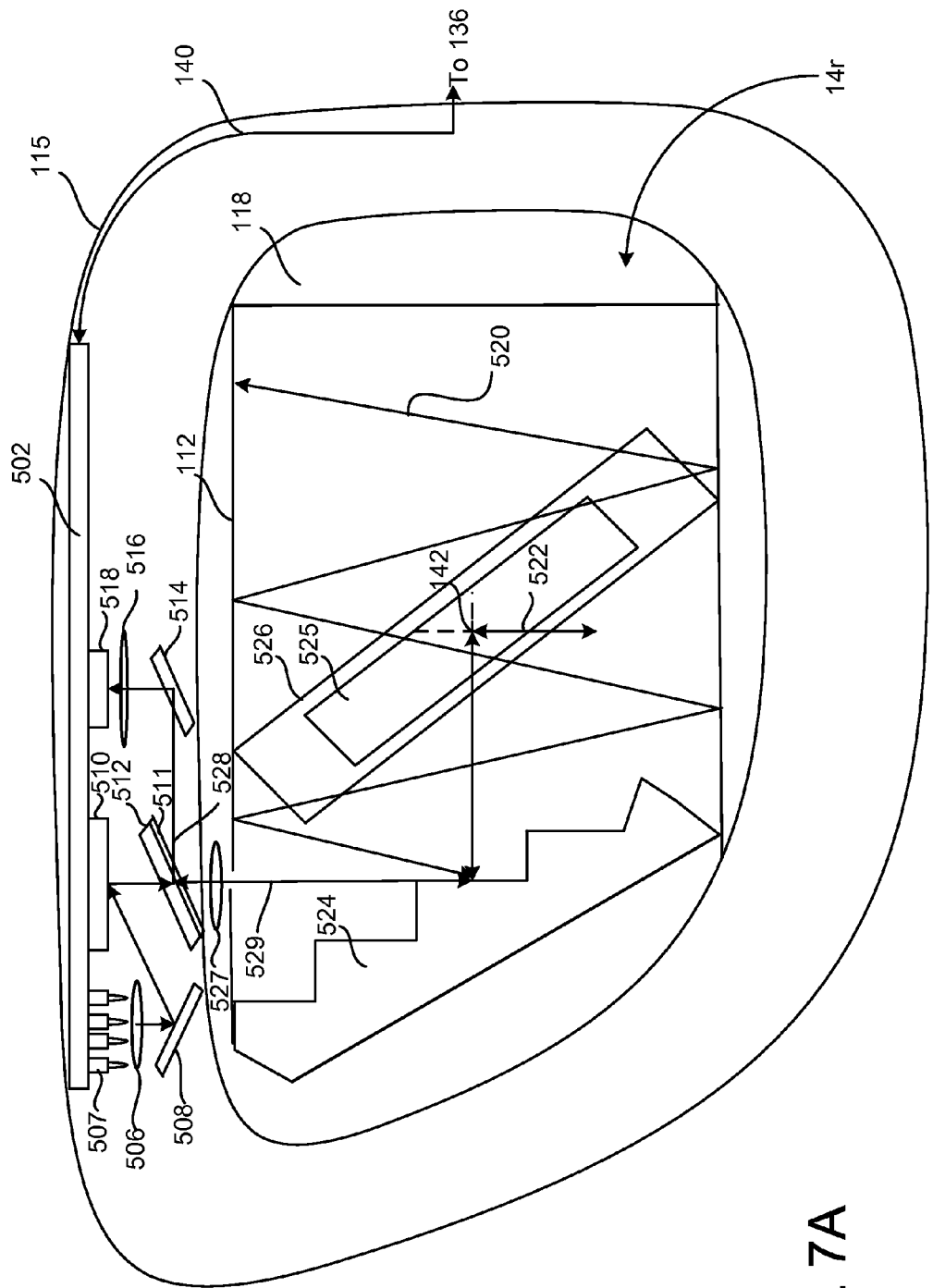
FIG. 7A is a view from the perspective of an eye looking through a planar waveguide of another embodiment of an integrated eye tracking and display optical system using modulated light sources and a 2D scanning mirror.

FIG. 7A is a view from the perspective of an eye looking through a planar waveguide of another embodiment of an integrated eye tracking and display optical system using modulated light sources and a 2D scanning mirror. This embodiment is another version of the embodiment of FIG. 5A accept that the integrated array of light sources 504 is replaced by individual light sources 507. In this example, four light sources are shown in keeping with the context of examples using red, green and blue to generate different colors but other combinations, of course, may be used. In this example, one of the light sources (e.g. laser, LED) transmits red spectrum illumination, another blue spectrum illumination, another green spectrum illumination and another infrared spectrum illumination, so three light sources are generating the colors making up all the segments of the image. In this example, the scanning mirror 510 is a two dimensional scanning mirror which moves in both the vertical and horizontal directions to reproduce each image segment represented by a current output of the lasers onto the optical element 512 to complete the image. Optical element 512 is analogous to a projector screen.

Figure 7B:
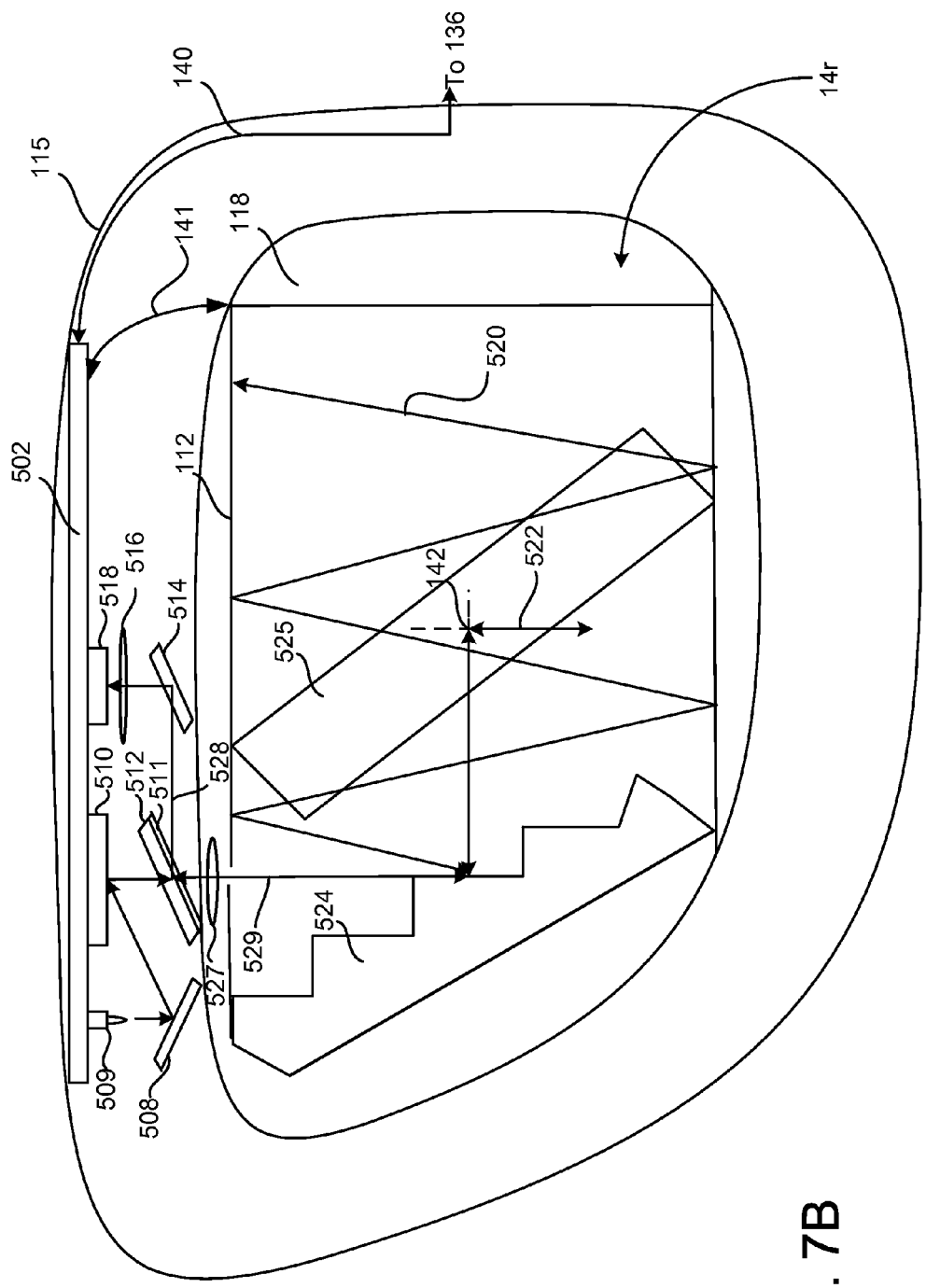
FIG. 7B illustrates another version of the embodiment of FIG. 7A using a single modulated light source and an active grating.

FIG. 7B illustrates another version of the embodiment of FIG. 7A using a single modulated light source and an active grating. In this example, the set of individual light sources is replaced by a single light source 509 which is modulated to one of a number of wavelengths in the visible spectrum and also for generating illumination in the infrared spectrum. The scanning mirror is a two-dimensional scanning mirror. In this example, the light source transmits the infrared and visible illumination at separate time intervals. The scanning mirror directs the IR illumination towards the center of element 512 through the collimating lens 516 and into the waveguide 112.

A single active grating, also referred to as a switchable grating may be used for the wavelength selective filter 525 which filters visible and infrared wavelengths into and out of the waveguide 112 along optical axis 142 toward and from the eye (e.g. 522). Within the frame 115, an electrical connection 141 is made between the electronics module 502 and the planar waveguide 112. A control signal from the active gratings controller 237 modulates the wavelength selectivity of the grating 525 between the visible spectrum and the infrared spectrum in timing with the separate time intervals for modulation of the single source for generating the different visible and infrared wavelengths.

Figure 8:
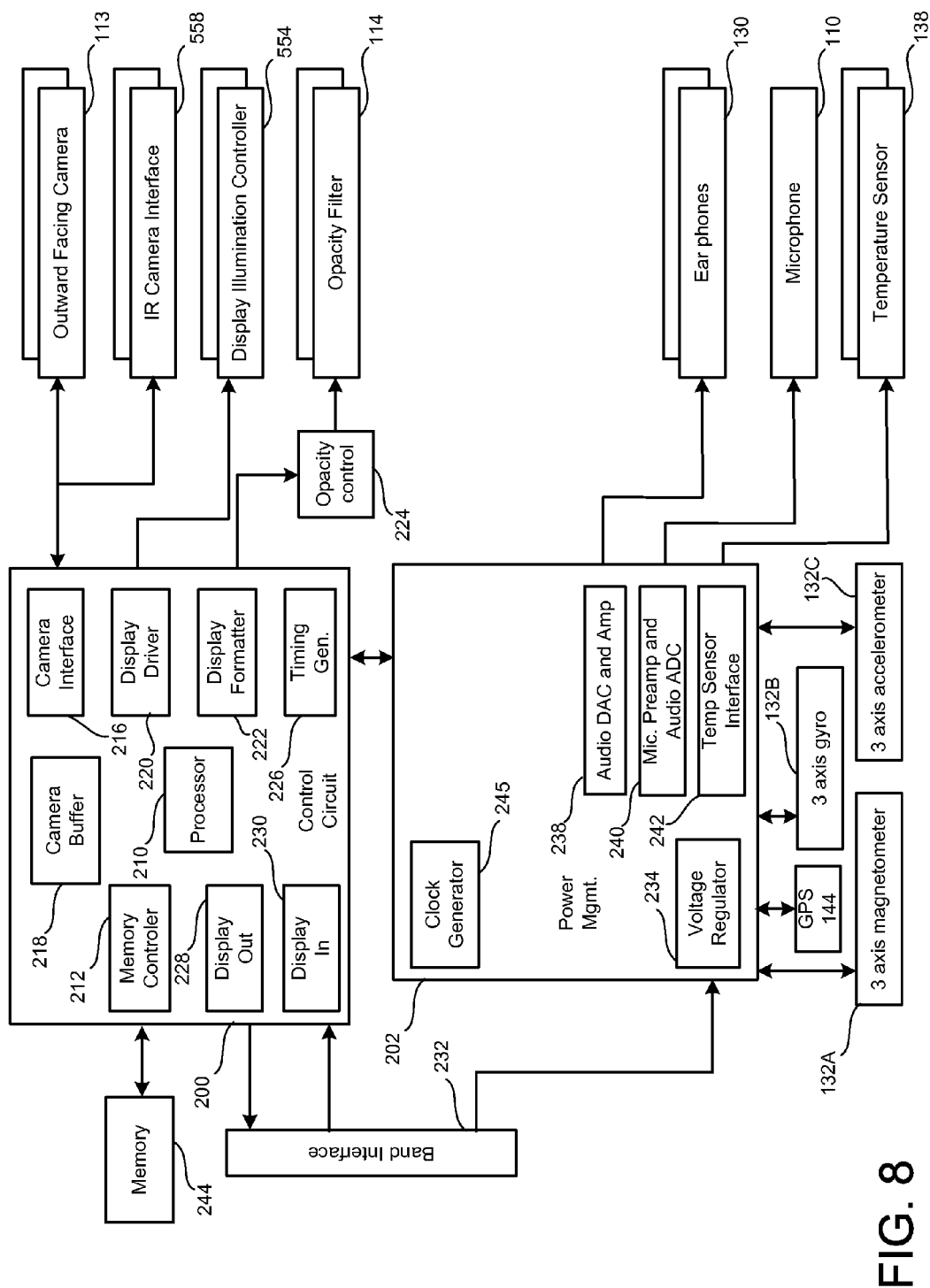
FIG. 8 is a block diagram of another embodiment of hardware and software components of a see-through, near-eye, mixed reality display device for use with an image generation unit comprising light sources and a scanning mirror.

FIG. 8 is a block diagram of another embodiment of hardware and software components of a see-through, near-eye, mixed reality display device for use with an image generation unit comprising light sources and a scanning mirror. This embodiment is another version of the hardware and software components of FIG. 3A in which the control circuitry 136 interfaces with the electronics module 502. In this embodiment, the display driver 220 provides its image data to a display illumination controller 554 of the electronics module 502. In this embodiment, the IR sensor 518 or the IR sensing elements "S" in 505 are IR image sensing elements, and an IR camera interface 558 of the electronics module 502 is coupled to the camera interface 216 for transferring the IR image data for eye tracking processing.

Figure 9:
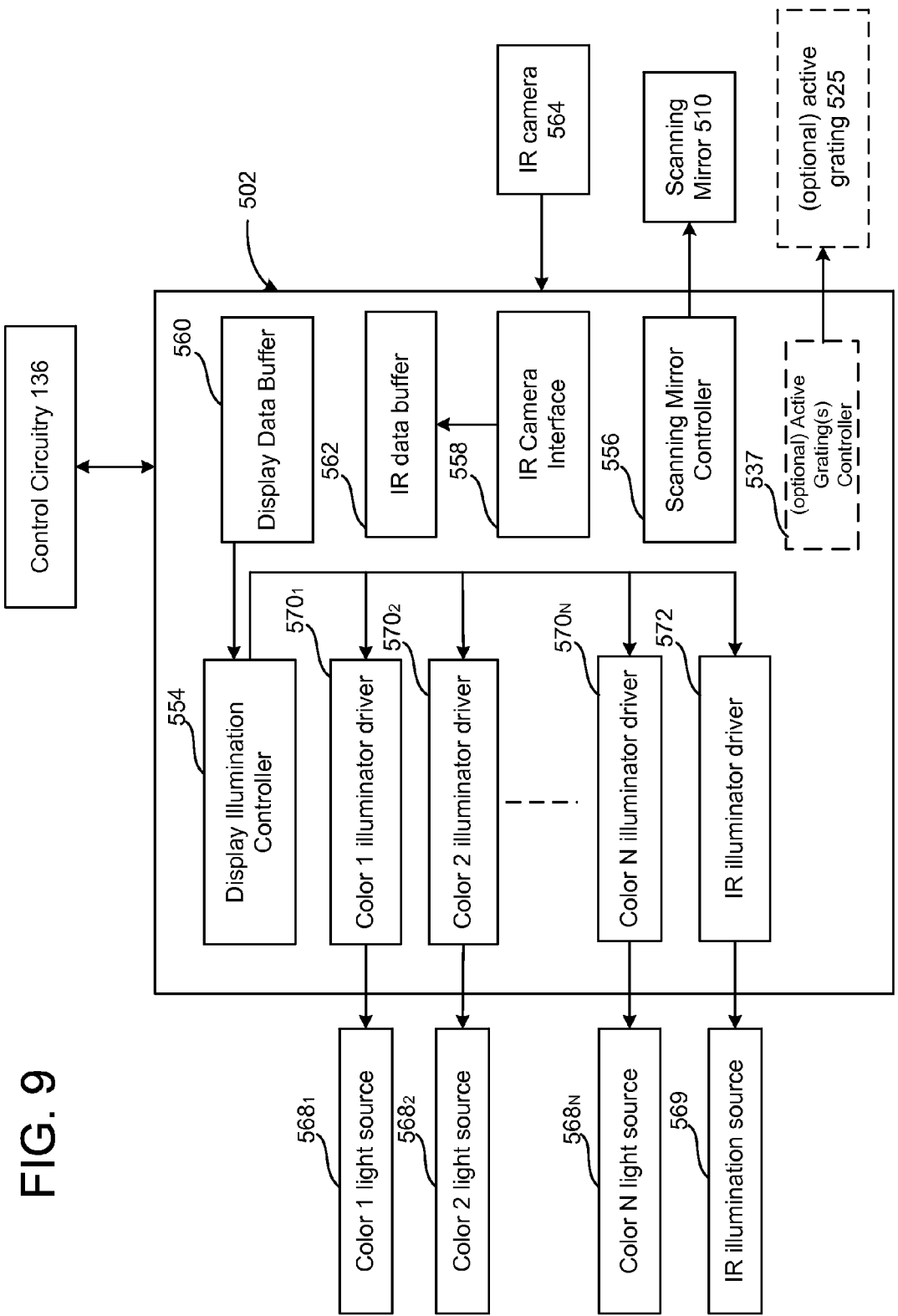
FIG. 9 is a block diagram of an embodiment of an electronics module which may be used for controlling hardware components of an integrated eye tracking and display system using at least one light source and a scanning mirror.

FIG. 9 is a block diagram of an embodiment of an electronics module which may be used for controlling hardware components of an integrated eye tracking and display system using at least one light source and a scanning mirror. The electronics module 502 is communicatively coupled to the control circuitry 136, for example via electrical connections 140 as shown in FIGS. 5A, 5B, 7A and 7B. The display illumination controller 554 receives image data from the display driver 220 and stores it in a display data buffer 560. The display illumination controller 554 translates the image data into modulation signals for the visible light sources 568 here denoted as color 1 light source $568_1$, color 2 light source $568_2$, and color N light source $568_N$. The controller 554 sends each light source modulation signal to control the respective driver 570 of the light source 568. The display illumination controller 554 also provides a modulation signal for a predetermined IR wavelength or range of IR wavelengths for the IR illumination driver 572 which drives the IR light source 569. Each light source 568 may be a single separate modulated light source as in FIGS. 7A and 7B or be part of an integrated array of light sources 504 or an integrated array of optical elements 505. In some embodiments, the drivers 570, 572 may also be integrated in an array, and each driver drives a corresponding light source 568 in a corresponding array 504, 505. In other embodiments, the drivers 570 may activate a line of light sources 568 or a set of light sources 568 in an array in a sequence of time intervals. In the case of the single separate light source 509 of FIG. 7B, there can be just one driver which generates modulated signals in both the IR and visible light spectrums or a switch (not shown) can switch the modulation signals from the different drivers 570 and 572 for receipt by light source 509.

The electronics module 510 also includes a scanning mirror controller 556 for controlling the movement of the scanning mirror 510. In some instances, the scanning mirror controller 556 can be programmed to perform one dimensional scanning or two dimensional scanning. An IR camera interface 558 receives the data representative of the photons received by the IR camera 564 in this example, and stores them in an IR data buffer 562 from which the interface 558 transfers them to the camera interface 216 of the control circuitry.

An integrated eye tracking and display system as described in the embodiments above simplifies eye tracking processing for many applications such as measuring vergence, interpupillary distance (IPD), gaze determination, eye movement based commands and biometric identification. Additionally, the integration of eye tracking and the display system as described may be implemented in form factors suitable for generally available consumer products.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated eye tracking and display system for a near-eye, mixed reality display device comprising:

a display optical system positioned to be seen through by an eye by the near-eye, mixed reality display device, the display optical system having an optical axis and a planar waveguide;

one or more wavelength selective filters positioned in the planar waveguide in co-axial alignment with the optical axis of the display optical system for directing infrared and visible illumination out of the planar waveguide in the direction of the eye and for directing infrared reflections from the eye into the planar waveguide; and an integrated array of optical elements including light sources interspersed with one or more infrared sensors, the light sources being for transmitting infrared and visible illumination, the light sources being optically coupled to the planar waveguide for directing their illumination into the planar waveguide, and the one or more infrared sensors of the integrated array being optically coupled to the planar waveguide for receiving infrared reflections directed from the one or more wavelength selective filters.

2. The system of claim 1 wherein the one or more wavelength selective filters comprises a bidirectional infrared wavelength selective filter.

3. The system of claim 1 wherein the integrated array of optical elements includes a linear array of lines of the light sources which are scanned by a scanning mirror for coupling the visible and infrared illumination into the planar waveguide.

4. The system of claim 3 wherein infrared reflections of the eye are optically coupled in a reverse optical path from at least one of the one or more wavelength selective filters in the planar waveguide to the scanning mirror and to the one or more infrared sensors in the integrated array of optical elements.

5. The system of claim 4 wherein the scanning mirror is a two-dimensional scanning mirror.

6. The system of claim 3 wherein the scanning mirror is implemented using micro electromechanical system technology.

7. The system of claim 1 wherein the one or more wavelength selective filters further comprise an active grating being modulated for being selective for different wavelengths in the visible and infrared spectrums at separate time intervals.

8. The system of claim 1 wherein the integrated array of optical elements including light sources interspersed with one or more infrared sensors further comprises an integrated array of lines of the light sources interspersed with lines of infrared sensors.

9. A method for processing visible and infrared wavelengths for image display and eye tracking in a display optical system of a near-eye, mixed reality display device comprising:

optically coupling visible and infrared illumination from an integrated array of optical elements including visible and infrared light sources interspersed with one or more infrared sensors into a planar waveguide positioned in the display optical system to be seen through by an eye in a first direction of an optical path of the planar waveguide;

directing the visible and infrared illumination toward an eye out of the planar waveguide by one or more wavelength selective filters co-axially aligned with an optical axis of the display optical system;

directing infrared reflections from the eye by the one or more wavelength selective filters into the planar waveguide in a second direction of the same optical path;

optically coupling the infrared reflections from the planar waveguide to the one or more infrared sensors of the integrated array of optical elements; and storing data generated by the one or more infrared sensors as eye tracking data.

10. The method of claim 9 further comprises:

transmitting the infrared and visible illumination at separate time intervals;

wherein the one or more wavelength selective filters co-axially aligned with the optical axis of the display optical system includes an active grating; and modulating a wavelength selectivity of the active grating between a visible spectrum and an infrared spectrum in timing with the separate time intervals.

11. The method of claim 9 wherein optically coupling visible and infrared illumination into the planar waveguide in the first direction of the optical path further comprises a first wavelength selective filter passing through the visible and infrared illumination in the first direction into the planar waveguide; and wherein optically coupling the infrared reflections from the planar waveguide to the one or more infrared sensors of the integrated array of optical elements further comprises the first wavelength selective filter passing through only infrared reflections received from the planar waveguide to the one or more infrared sensors.

12. The method of claim 9 wherein the integrated array of optical elements including visible and infrared light sources interspersed with one or more infrared sensors further comprises an integrated array of lines of the light sources interspersed with lines of infrared sensors.

* * * * *